United States Patent
Yegorin

(10) Patent No.: US 11,663,197 B2
(45) Date of Patent: May 30, 2023

(54) CONVOLUTIONAL AND EPHEMERAL DATACHAINS WITH CONDITIONAL PERIOD

(71) Applicant: International Business Machines Corporation, Armonk, NY (US)

(72) Inventor: Anton Yegorin, Dublin (IE)

(73) Assignee: International Business Machines Corporation, Armonk, NY (US)

(*) Notice: Subject to any disclaimer, the term of this patent is extended or adjusted under 35 U.S.C. 154(b) by 265 days.

(21) Appl. No.: 16/176,399

(22) Filed: Oct. 31, 2018

(65) Prior Publication Data

US 2020/0134066 A1 Apr. 30, 2020

(51) Int. Cl.
*G06F 16/23* (2019.01)
*H04L 9/06* (2006.01)
*H04L 9/00* (2022.01)

(52) U.S. Cl.
CPC ........ *G06F 16/2379* (2019.01); *H04L 9/0637* (2013.01); *H04L 9/50* (2022.05)

(58) Field of Classification Search
CPC .. G06F 16/2379; G06F 16/27; G06F 16/2255; G06F 16/1805; G06F 16/182; G06F 16/2365; G06F 16/2465; G06F 16/28; G06F 16/903; G06F 16/13; G06F 16/1834; G06F 16/1837; G06F 16/2471; G06F 16/25; G06F 16/162; G06F 21/6218; G06F 16/2358; G06F 16/9024; G06F 16/214; G06F 16/278; H04L 9/0637; H04L 2209/38; H04L 9/3297; H04L 9/3239; H04L 9/50
See application file for complete search history.

(56) References Cited

U.S. PATENT DOCUMENTS

| | | | |
|---|---|---|---|
| 9,928,290 B2 | 3/2018 | Tiell | |
| 10,715,531 B2* | 7/2020 | Thekadath | H04L 9/3247 |
| 10,826,685 B1* | 11/2020 | Campagna | H04L 9/3247 |
| 2016/0191243 A1* | 6/2016 | Manning | H04L 9/321 |
| | | | 713/168 |
| 2016/0330034 A1 | 11/2016 | Back et al. | |
| 2016/0350861 A1* | 12/2016 | Loughlin-McHugh | |
| | | | H04L 9/3236 |
| 2017/0132620 A1 | 5/2017 | Miller et al. | |
| 2017/0132621 A1 | 5/2017 | Miller et al. | |
| 2018/0025435 A1* | 1/2018 | Karame | H04L 9/3236 |
| | | | 705/30 |

(Continued)

OTHER PUBLICATIONS

Anonymously, A method and system to automatically generate automation asset based on test cases and maintain consistency, ip.com.

(Continued)

*Primary Examiner* — Cam Y T Truong

(57) ABSTRACT

An example operation may include one or more of determining a data point trigger has occurred at a particular block cycle of a blockchain, initiating a sidechain to store subsequent entries based on the data point trigger, and a genesis block of the sidechain includes one or more relevant data fields from the blockchain, initiating a sidechain smart contract to manage data entries submitted to the sidechain, storing the data entries in the sidechain for a conditional period, and when the conditional period has matured, convoluting the sidechain into the blockchain.

14 Claims, 15 Drawing Sheets

(56) References Cited

U.S. PATENT DOCUMENTS

| | | | |
|---|---|---|---|
| 2018/0365686 A1* | 12/2018 | Kondo | G06Q 20/382 |
| 2019/0109707 A1* | 4/2019 | Ajoy | H04L 9/0637 |
| 2019/0116034 A1* | 4/2019 | Sengupta | G06Q 20/3829 |
| 2019/0205844 A1* | 7/2019 | Nuzzi | G06Q 20/065 |
| 2019/0238316 A1* | 8/2019 | Padmanabhan | H04L 9/3297 |
| 2019/0273605 A1* | 9/2019 | Gabriel | H04L 9/3239 |
| 2019/0303853 A1* | 10/2019 | Cantrell | G06F 16/1824 |
| 2019/0303886 A1* | 10/2019 | Kikinis | H04L 9/0637 |
| 2019/0375373 A1* | 12/2019 | Pepe | H04L 9/3247 |
| 2020/0042615 A1* | 2/2020 | Boudville | G06F 16/1805 |
| 2020/0068573 A1* | 2/2020 | Drozd | H04M 15/00 |
| 2020/0344233 A1* | 10/2020 | Lai | G06Q 20/0855 |

OTHER PUBLICATIONS

Anonymously, System and Method for Software Asset Management by Blockchain and Smart Contracts, ip.com Oct. 24, 2016.

Bashir, I., Mastering Blockchain, Packt Publishing, Birmingham-Mumbai, Mar. 2017.

Wang, W. et al., A Survey on Consensus Mechanisms and Mining Management in Blockchain Networks, IEEE, May 7, 2018.

* cited by examiner

640

CONVOLUTIONAL AND EPHEMERAL DATACHAINS WITH CONDITIONAL PERIOD

TECHNICAL FIELD

This application generally relates to ephemeral datachains, and more particularly, convolutional and ephemeral datachains.

BACKGROUND

A centralized database stores and maintains data in one single database (e.g., database server) at one location. This location is often a central computer, for example, a desktop central processing unit (CPU), a server CPU, or a mainframe computer. Information stored on a centralized database is typically accessible from multiple different points. Multiple users or client workstations can work simultaneously on the centralized database, for example, based on a client/server configuration. A centralized database is easy to manage, maintain, and control, especially for purposes of security because of its single location. Within a centralized database, data redundancy is minimized as a single storing place of all data also implies that a given set of data only has one primary record.

However, a centralized database suffers from significant drawbacks. For example, a centralized database has a single point of failure. In particular, if there are no fault-tolerance considerations and a hardware failure occurs (for example a hardware, firmware, and/or a software failure), all data within the database is lost and work of all users is interrupted. In addition, centralized databases are highly dependent on network connectivity. As a result, the slower the connection, the amount of time needed for each database access is increased. Another drawback is the occurrence of bottlenecks when a centralized database experiences high traffic due to a single location. Furthermore, a centralized database provides limited access to data because only one copy of the data is maintained by the database. As a result, multiple devices cannot access the same piece of data at the same time without creating significant problems or risk overwriting stored data. Furthermore, because a database storage system has minimal to no data redundancy, data that is unexpectedly lost is very difficult to retrieve other than through manual operation from back-up storage.

Conventionally, a centralized database is limited by its ability to manage dynamic changes, such as sub-chains of data which may be needed on a temporary basis to manage dynamic data management requirements. As such, what is needed is a solution to overcome these significant drawbacks.

SUMMARY

One example embodiment provides a system including a computing node configured to determine a data point trigger has occurred at a particular block cycle of a blockchain, initiate a sidechain to store subsequent entries based on the data point trigger, and a genesis block of the sidechain comprises one or more relevant data fields from the blockchain, initiate a sidechain smart contract to manage data entries submitted to the sidechain, store the data entries in the sidechain for a conditional period, and when the conditional period has matured, convolute the sidechain into the blockchain.

Another example embodiment provides a method that includes determining a data point trigger has occurred at a particular block cycle of a blockchain, initiating a sidechain to store subsequent entries based on the data point trigger, and a genesis block of the sidechain comprises one or more relevant data fields from the blockchain, initiating a sidechain smart contract to manage data entries submitted to the sidechain, storing the data entries in the sidechain for a conditional period, and when the conditional period has matured, convoluting the sidechain into the blockchain.

Yet another example embodiment includes a non-transitory computer readable storage medium configured to store instructions that when executed cause a processor to perform determining a data point trigger has occurred at a particular block cycle of a blockchain, initiating a sidechain to store subsequent entries based on the data point trigger, and a genesis block of the sidechain comprises one or more relevant data fields from the blockchain, initiating a sidechain smart contract to manage data entries submitted to the sidechain, storing the data entries in the sidechain for a conditional period, and when the conditional period has matured, convoluting the sidechain into the blockchain.

DETAILED DESCRIPTION

Figure 1A:
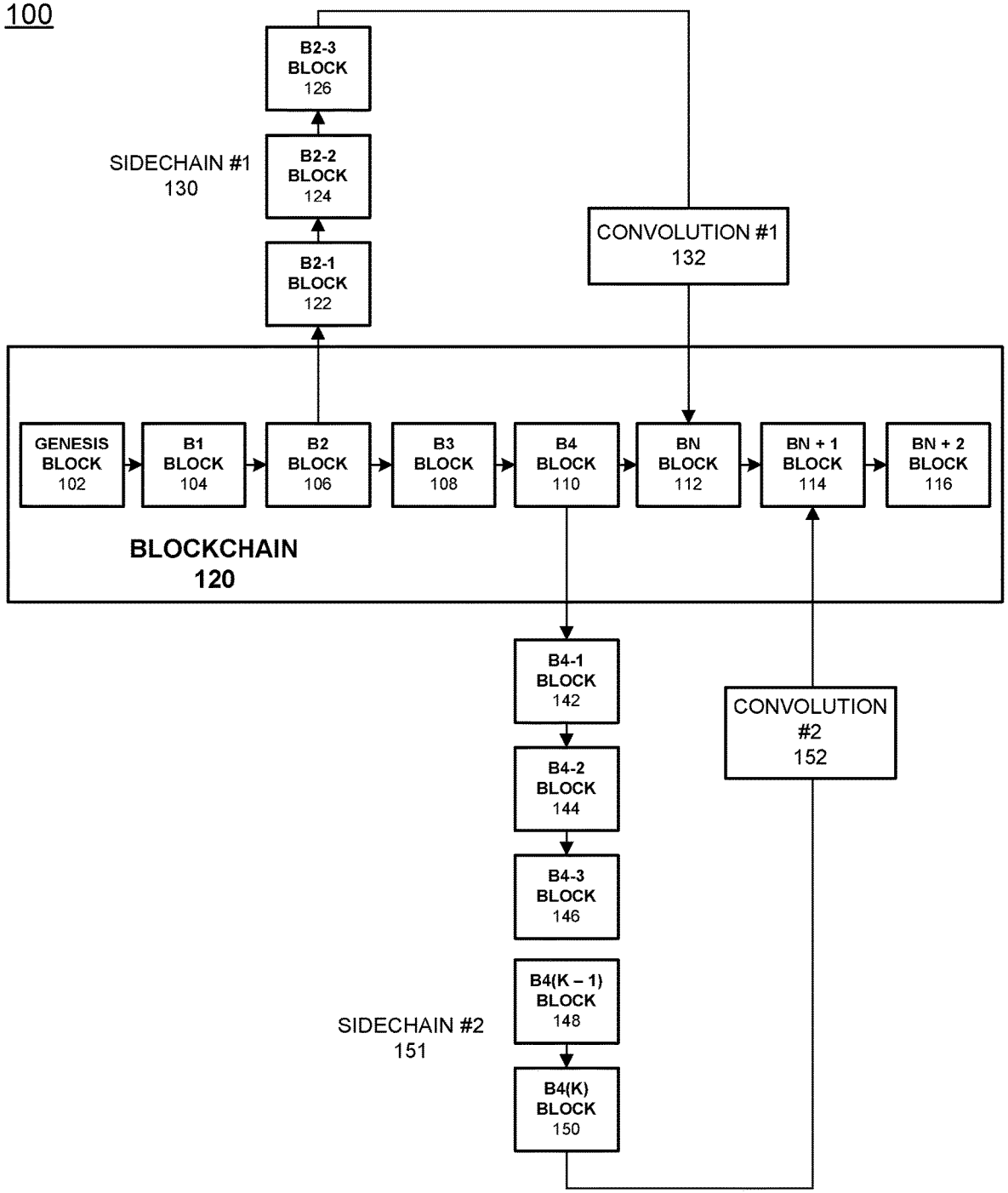
FIG. 1A illustrates a network diagram of a blockchain and sidechain configuration, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, which provide, for permissioned blockchain implementations, a mechanism to manage a main distributed ledger (i.e., blockchain) by spawning new ephemeral blockchains (sidechains) with a custom execution code (i.e., smart contracts) on an as-needed basis. As a result, select portions of the main/root blockchain can be deposited into the sidechains. The sidechains may operate in parallel to the existing and concurrent operation of the main 'blockchain'. When a sidechain finalizes its intended purpose (i.e., store membership information for a new set of members, export private information away from the blockchain as it is received, export large files which are not practical to store in the blockchain, etc.), the sidechain may convolute/retract into a compact form by retracting its contents into the root blockchain thus preserving consistency of assets across an entire blockchain graph. The examples provide a computer-implemented method for accessing, developing and maintaining a decentralized database through a peer-to-peer network, to preserve the original state of data inputs while providing flexibility with creating releasable sidechains and thus permitting a blockchain to scale accordingly.

A decentralized database is a distributed storage system which includes multiple nodes that communicate with each other. A blockchain is an example of a decentralized database which includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage entries, group the storage entries into blocks, and build a hash chain over the blocks. This process forms the ledger by ordering the storage entries, as is necessary, for consistency. In a public or permission-less blockchain, anyone can participate without a specific identity. Public blockchains often involve native cryptocurrency and use consensus based on various protocols such as Proof of Work (PoW). On the other hand, a permissioned blockchain database provides a system which can secure inter-actions among a group of entities which share a common goal but which do not fully trust one another, such as businesses that exchange funds, goods, information, and the like.

A blockchain operates arbitrary, programmable logic, tailored to a decentralized storage scheme and referred to as "smart contracts" or "chaincodes." In some cases, specialized chaincodes may exist for management functions and parameters which are referred to as system chaincode. Smart contracts are trusted distributed applications which leverage tamper-proof properties of the blockchain database and an underlying agreement between nodes which is referred to as an endorsement or endorsement policy. In general, blockchain entries typically must be "endorsed" before being committed to the blockchain while entries which are not endorsed are disregarded. A typical endorsement policy allows chaincode to specify endorsers for an entry in the form of a set of peer nodes that are necessary for endorsement. When a client sends the entry to the peers specified in the endorsement policy, the entry is executed to validate the entry. After validation, the entries enter an ordering phase in which a consensus protocol is used to produce an ordered sequence of endorsed entries grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits an entry-invocation to an endorser (e.g., peer), and broadcasts entry-proposals to an ordering service (e.g., ordering node). Another type of node is a peer node which can receive client submitted entries, commit the entries and maintain a state and a copy of the ledger of blockchain entries. Peers can also have the role of an endorser, although it is not a requirement. An ordering-service-node or orderer is a node running the communication service for all nodes, and which implements a delivery guarantee, such as a broadcast to each of the peer nodes in the system when committing entries and modifying a world state of the blockchain, which is another name for the initial blockchain entry which normally includes control and setup information.

A ledger is a sequenced, tamper-resistant record of all state transitions of a blockchain. State transitions may result from chaincode invocations (i.e., entries) submitted by participating parties (e.g., client nodes, ordering nodes, endorser nodes, peer nodes, etc.). An entry may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is an entry log which is structured as hash-linked blocks, and each block contains a sequence of N entries where N is equal to or greater than one. The block header includes a hash of the block's entries, as well as a hash of the prior block's header. In this way, all entries on the ledger may be sequenced and cryptographically linked together. Accordingly, it is not possible to tamper with the ledger data without breaking the hash links. A hash of a most recently added blockchain block represents every entry on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain entry log. Because the current state represents the latest key values known to a channel, it is sometimes referred to as a world state. Chaincode invocations execute entries against the current state data of the ledger. To make these chaincode interactions efficient, the latest values of the keys may be stored in a state database. The state database may be simply an indexed view into the chain's entry log, it can therefore be regenerated from the chain at any time. The state database may automatically be recovered (or generated if needed) upon peer node startup, and before entries are accepted.

Blockchain is different from a traditional database in that the blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein.

The example embodiments provide a new solution to scale-up a blockchain infrastructure and introduce a releasable sidechain transaction log to cover a variety of use cases for optimal blockchain performance. The embodiments include a modification to a blockchain core structure. One example approach may include a blockchain that is decentralized/distributed and where this blockchain is highly available by multiple parties, as well as a root blockchain that relies on transaction log immutability sidechains. The consensus approach for approval is used for the main blockchain and the sidechains as well.

Optimization may include minimizing a size of a transaction log data by using sidechains. Regular nodes of the blockchain network (i.e., light nodes) are not required to download sidechains or compute data on them whenever a new transaction is identified. Light nodes still perform verification/validity but convoluted sidechains are disposable by nature, so the amount of data required to be maintained locally is significantly less by comparison with traditional blockchains. This approach provides optimal computing speeds, communications and processing requirements. An original root chain genesis includes settings for sidechains, such as limits to a maximum number of sidechains permitted, if open/closed sidechains are supported, smart contracts supported in the sidechains, maximum owners/participants per private sidechain etc.

A sidechain genesis block may include standard fields, a type of sidechain (i.e., visibility: open, closed), an owners' list, if applicable, private chain designation, participant list, if applicable, a difficulty field, which is inherited from the main chain, a hash from the main root chain, and an owner signature. A sidechain transaction/entry may include a sidechain ID from the genesis block, a type (i.e., regular, convoluted), a script part, which is is updated to support sidechain validation (i.e., owner's signature, list of participants, visibility constraints etc.), a sidechain tail transaction ID, if applicable. The transaction block header may include a number of convoluted transactions, a list of convoluted transactions, a range along with a sidechain ID, a sidechain ID for a block, and a difficulty (if applicable) can be adjusted on a per sidechain basis.

FIG. 1A illustrates a network diagram of a blockchain and sidechain configuration, according to example embodiments. Referring to FIG. 1A, the configuration 100 provides a blockchain 120 that includes various blocks 102-116. Each of the blocks are finalized/hashed/committed prior to the next block being created. Each block hosts multiple data entries or blockchain transactions. The genesis block 102 is a foundational/first block that includes information about the blockchain that can be used throughout the blockchain's lifecycle. In one example, a sidechain 130 may be spawned with its own intended purpose to offload certain data from the blockchain 120 into the sidechain 130. The initiation of the sidechain(s) 130/150 may be based on a particular data point trigger, such as a counter for a particular transaction number (e.g., transaction num=1000 then launch sidechain, etc.), a particular file type, a particular data type, a particular file size, private information, a particular asset initiator/receiver/organization, identified parties to an asset transfer, etc. When the data point trigger is identified by the computing module that is responsible for managing incoming transactions, the sidechain may be created to include new transactions to store the specific data types of interest.

Example triggers, as conditions precedent to initiating a sidechain, may include, for instance, two or more parties seeking to have quick access to asset transfers, and thus when the asset is identified in the blockchain transaction, it may be moved to a sidechain once it is identified as having a time sensitive asset flag or a pre-stored party's preference parameter set by one or more of the parties. Once the flag is identified, the asset and the corresponding transaction may be moved to a sidechain, so the asset transfer can occur at a higher speed so a transaction log, separate from the root (main) chain, can be updated accordingly to provide the parties with a finalized blockchain entry. Parties can continue to move and transfer assets via sidechain transactions as long as desired or until the sidechain owner decides to convolute the data into the blockchain and collapse the sidechain. In one example, the initial sidechain transaction which spawned the sidechain should contain a signature for the sidechain owner (i.e., initiator). Optionally, there may be other co-owners/actors being added to the sidechain membership group to signify trust between sidechain parties. An open sidechain indicates that anyone can transfer assets to the sidechain while closed sidechains permit only owners/co-owners/members specifically identified in a list of the blockchain to participate.

Blockchain miners can also be initiators of a sidechain and there could be automatic triggers in case of an open non-enhanced private blockchain structure configured through a genesis block of the sidechain. Therefore, a blockchain can have pre-configured triggers for sidechains, such as, for example, when a number of transactions between two or more parties is greater than a particular threshold then their assets are moved to a sidechain to provide a more optimal processing structure. Another example may include natural root chain 'sharding', which may be described as the off-loading of blockchain data and spawning of sidechains and distributing members among those sidechains created. Triggers for sidechain access can also be performed by miners either through smart contract execution or by the member actions. Those sidechains would remain open as there is a capability for asset owners to access the blockchain and various sidechains.

The first sidechain 130 is illustrated as having been created during the existence of block 2 (106) on the main blockchain 120. The data point trigger was identified from a context of a smart contract used to manage the blockchain 120. The identification of the data point trigger caused the sidechain to be launched. The lifecycle of the sidechain may be based on a particular threshold such as a time threshold (e.g., 30 minutes, etc.), a number of blocks threshold (e.g., 5 blocks, etc.), a frequency of data occurrences threshold (e.g., organization A identified from majority of last 100 transactions, etc.). Once the sidechain 130 (blocks 122-126) has run its course and is no longer needed per the instructions of the sidechain smart contract, the decision may be made to convolute the sidechain into the blockchain 120. This process of convolution 132 may include taking portions of the sidechain data and incorporating it into the blockchain 120 (blocks 102-116), such as metadata portions of the various entries (e.g., parties, asset data, dates, values, etc.) submitted to the sidechain 130 so that those entries can be identified for audit purposes and recalled in their entirety if necessary. The entire sidechain data may be brought into the main blockchain during an off-cycle time (e.g., midnight to 8 am). In this example, the sidechain is created to offload the peak use periods of the blockchain 120 and then the data is eventually brought back to the blockchain in off-peak periods of time. Another sidechain 150 is created during the cycle of block B4 110. This second sidechain 150 is active for five blocks (142-150) and for a period of three blocks (110-114) of the main blockchain 120 before being convoluted 152 into the root chain at block 114. Each blockchain and sidechain has its own smart contract used to define its own entries/transactions. For example, in order to be effective and optimal, the smart contract for the first sidechain may identify the specific data points which would trigger transactions to be entered into the sidechain 130, all other transaction data may be suitable for the blockchain transactions of the main blockchain 120.

In one example embodiment, the main/root blockchain 120 permits any system participant to initiate a process of spawning new sidechains with custom execution logic. The conditions for when to create a sidechain may be part of the main blockchain smart contract. However, once created, the sidechain may have its own smart contract created to define the purpose and actions of the sidechain data and entries, and when to stop and close the sidechain from subsequent entries. The sidechain can be created by a blockchain participant depositing assets into the sidechain from the root chain (e.g., "sharding"), which cross-references transactions in the sidechain and the main chain by references to the main chain data placed into the sidechain data. Sidechains can share a common miner pool for finalization management purposes. Once created, the sidechain can run in parallel to the main blockchain so that both chains are being allocated with new entries at the same time. At the time of the sidechain finalization, which can be determined by execution code (e.g., expiration date/time, or other data point trigger, etc.) the sidechain data is then convoluted into the root blockchain so the sidechain is actually retracted into the root chain for long term data preservation.

Data convolution may provide partial data, complete data, and/or metadata specific parameters only (e.g., pointers), when collapsing a sidechain into the root blockchain. One example may include, a sidechain 'S1' with assets which transfer between parties A (sidechain value 10), and B (sidechain value 10) in a scenario: S1: A→B, 2 (A=8, B=12), S1: A→B, 1 (A=7, B=13), S1: B→A, 8 (A=15, B=7), and S1: A→B, 1 (A=14, B=8), with four transactions in total, and the result values are the only values that matter, so four transaction can be convoluted into either 1 or 2 depending on a blockchain transaction structure. If the transfers support batches, then one single transaction can have multiple transfers confirmed based on a final result, for example, there will be two convoluted transactions in the root chain as follows: A→B, 2, S1 and B→A, 4, S1, which leads to the same identical value at the end of the transaction record (A=14, B=8) and both transactions are part of the same mining block. Less data from multiple transactions leads to increased efficiency when post-processing sidechain data convolution occurs.

Figure 1B:
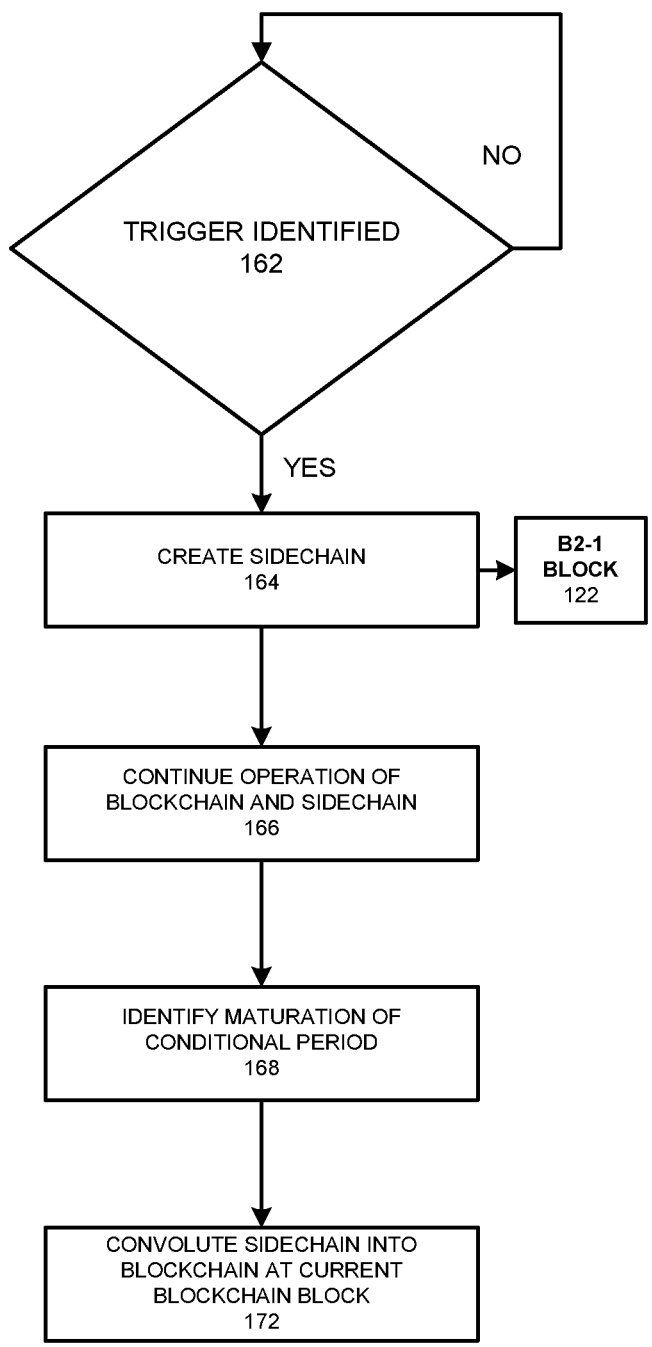
FIG. 1B illustrates a detailed network diagram of a blockchain and sidechain configuration, according to example embodiments.

FIG. 1B illustrates a detailed flow diagram of a blockchain and sidechain configuration, according to example embodiments. Referring to FIG. 1B, the example 160 provides a data point trigger 162 being identified in a particular blockchain block cycle. The sidechain 164 is created responsive to the data point trigger being identified. This initiates the sidechain and its first block 122. The operation of the blockchain and sidechain are continued in parallel 166 until a maturation point or conditional period 168 of the sidechain has been reached. The sidechain data may then be convoluted 172 into the blockchain, in part, or in its entirety depending on the blockchain operational conditions identified in the smart contract. The sidechain is then stopped and no further sidechain data is preserved outside the blockchain once the smart contract terms have been fulfilled.

Figure 2A:
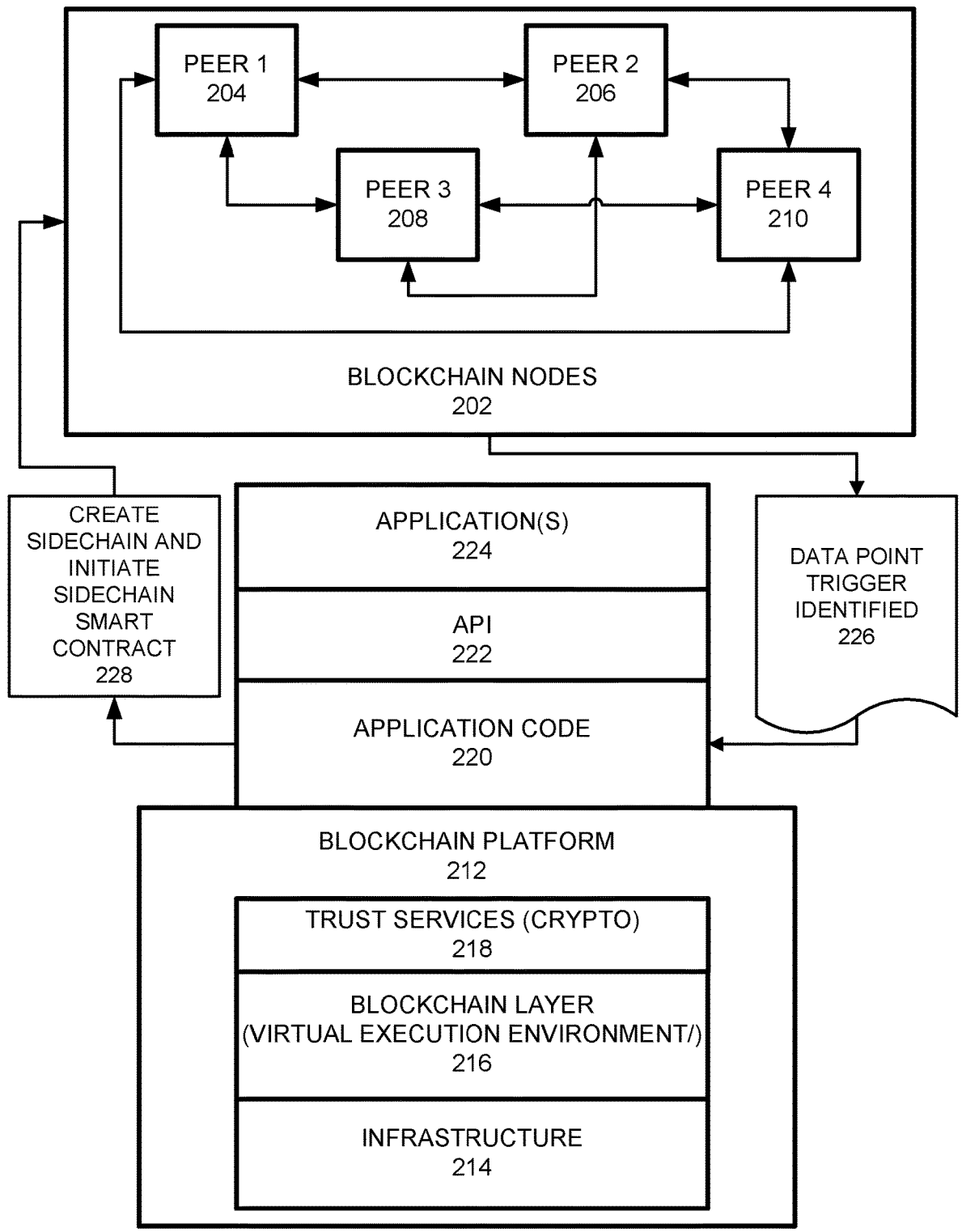
FIG. 2A illustrates an example peer node configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain entry addition and validation process (consensus). One or more of the blockchain nodes 204-210 may endorse entries based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as an entry and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new entries and provide access to auditors which are seeking to access data entries. The blockchain layer 216 may expose an interface that provides access to the virtual execution environment necessary to process the program code and engage the physical infrastructure 214. Cryptographic trust services 218 may be used to verify entries such as asset exchange entries and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information may include a data point trigger being identified 226, which may be processed by one or more processing entities (e.g., virtual machines) included in the blockchain layer 216. The result 228 may include a new sidechain being created to offload the blockchain data for whatever purpose the sidechain represents. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). An entry is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 2B:
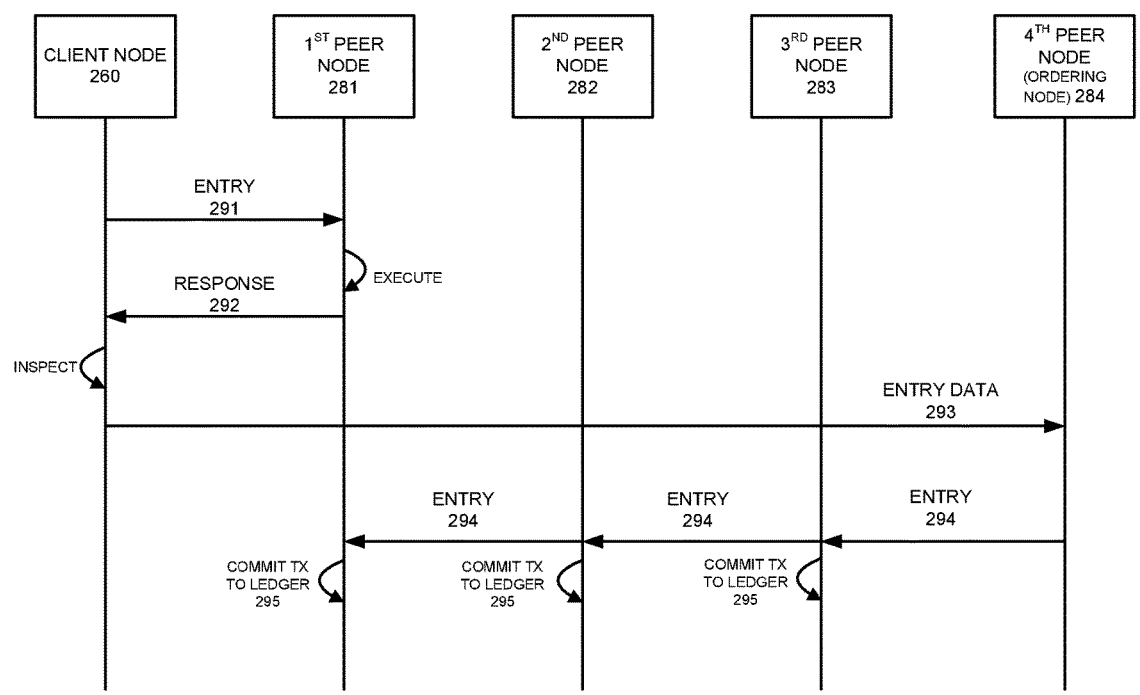
FIG. 2B illustrates a further peer node configuration, according to example embodiments.

FIG. 2B illustrates an example of a flow 250 between nodes of the blockchain in accordance with an example embodiment. Referring to FIG. 2B, the entry flow may include an entry proposal 291 sent by an application client node 260 to an endorsing peer node 281. The endorsing peer 281 may verify the client signature and execute a chaincode function to initiate the entry. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into an entry payload 293 and broadcasts it to an ordering service node 284. The ordering service node 284 then delivers ordered entries as blocks to all peers 281-283 on a channel. Before committal to the blockchain, each peer 281-283 may validate the entry. For example, the peers may check the endorsement policy to ensure that the correct allotment of the specified peers have signed the results and authenticated the signatures against the entry payload 293.

Referring again to FIG. 2B, the client node 260 initiates the entry 291 by constructing and sending a request to the peer node 281, which is an endorser. The client 260 may include an application leveraging a supported software development kit (SDK), such as NODE, JAVA, PYTHON, and the like, which utilizes an available API to generate an entry proposal. The proposal is a request to invoke a chaincode function so that data can be read and/or written to the ledger (i.e., write new key value pairs for the assets). The SDK may serve as a shim to package the entry proposal into a properly architected format (e.g., protocol buffer over a remote procedure call (RPC)) and take the client's cryptographic credentials to produce a unique signature for the entry proposal.

In response, the endorsing peer node 281 may verify (a) that the entry proposal is well formed, (b) the entry has not been submitted already in the past (replay-attack protection), (c) the signature is valid, and (d) that the submitter (client 260, in the example) is properly authorized to perform the proposed operation on that channel. The endorsing peer node 281 may take the entry proposal inputs as arguments to the invoked chaincode function. The chaincode is then executed against a current state database to produce entry results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the entry to the ordering node service 284. If the client application intends to submit the entry to the ordering node service 284 to update the ledger, the application determines if the specified endorsement policy has been fulfilled before submitting (i.e., did all peer nodes necessary for the entry endorse the entry). Here, the client may include only one of multiple parties to the entry. In this case, each client may have their own endorsing node, and each endorsing node will need to endorse the entry. The architecture is such that even if an application selects not to inspect responses or otherwise forwards an unendorsed entry, the endorsement policy will still be enforced by peers and upheld at the commit validation phase.

After successful inspection, in step 293 the client 260 assembles endorsements into an entry and broadcasts the entry proposal and response within an entry message to the ordering node 284. The entry may contain the read/write sets, the endorsing peers signatures and a channel ID. The ordering node 284 does not need to inspect the entire content of an entry in order to perform its operation, instead the ordering node 284 may simply receive entries from all channels in the network, order them chronologically by channel, and create blocks of entries per channel.

The blocks of the entry are delivered from the ordering node 284 to all peer nodes 281-283 on the channel. The entries 294 within the block are validated to ensure any endorsement policy is fulfilled and to ensure that there have been no changes to ledger state for read set variables since the read set was generated by the entry execution. Entries in the block are tagged as being valid or invalid. Furthermore, in step 295 each peer node 281-283 appends the block to the channel's chain, and for each valid entry the write sets are committed to current state database. An event is emitted, to notify the client application that the entry (invocation) has been immutably appended to the chain, as well as to notify whether the entry was validated or invalidated.

Figure 3:
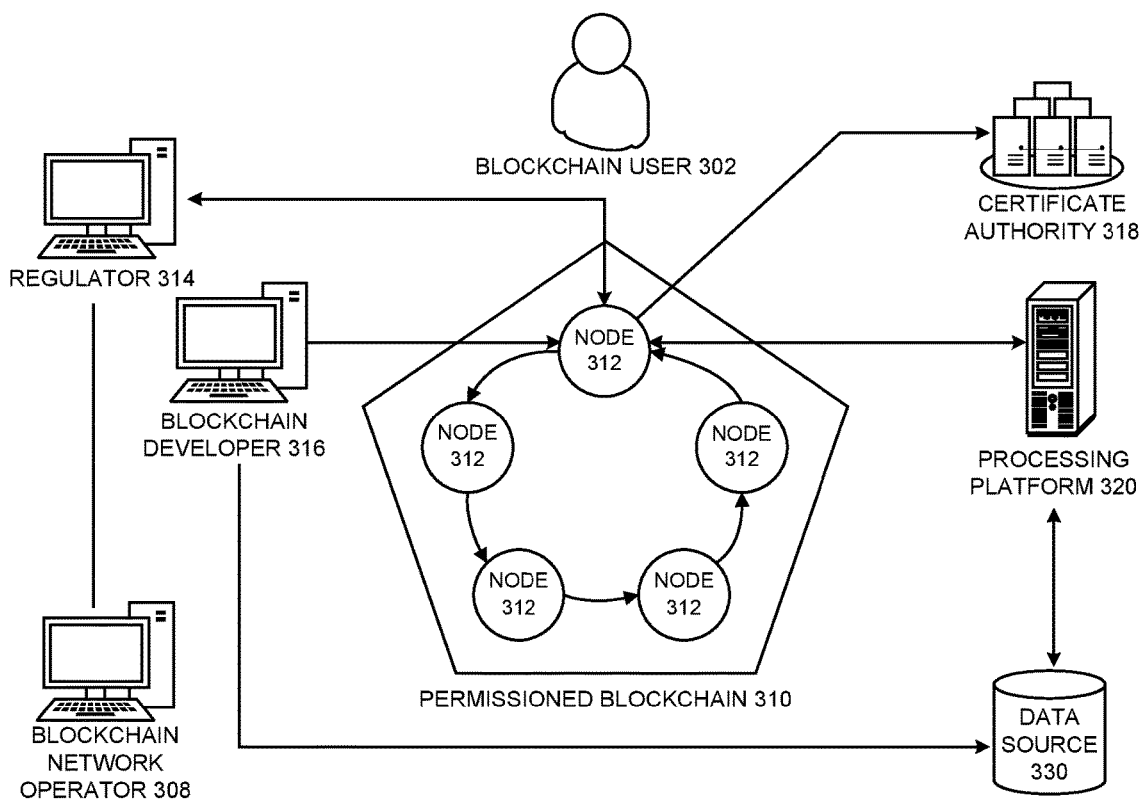
FIG. 3 illustrates a permissioned network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit an entry to the permissioned blockchain network 310. In this example, the entry can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any entries, the peer node 312 retrieves the user's enrollment and entry certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
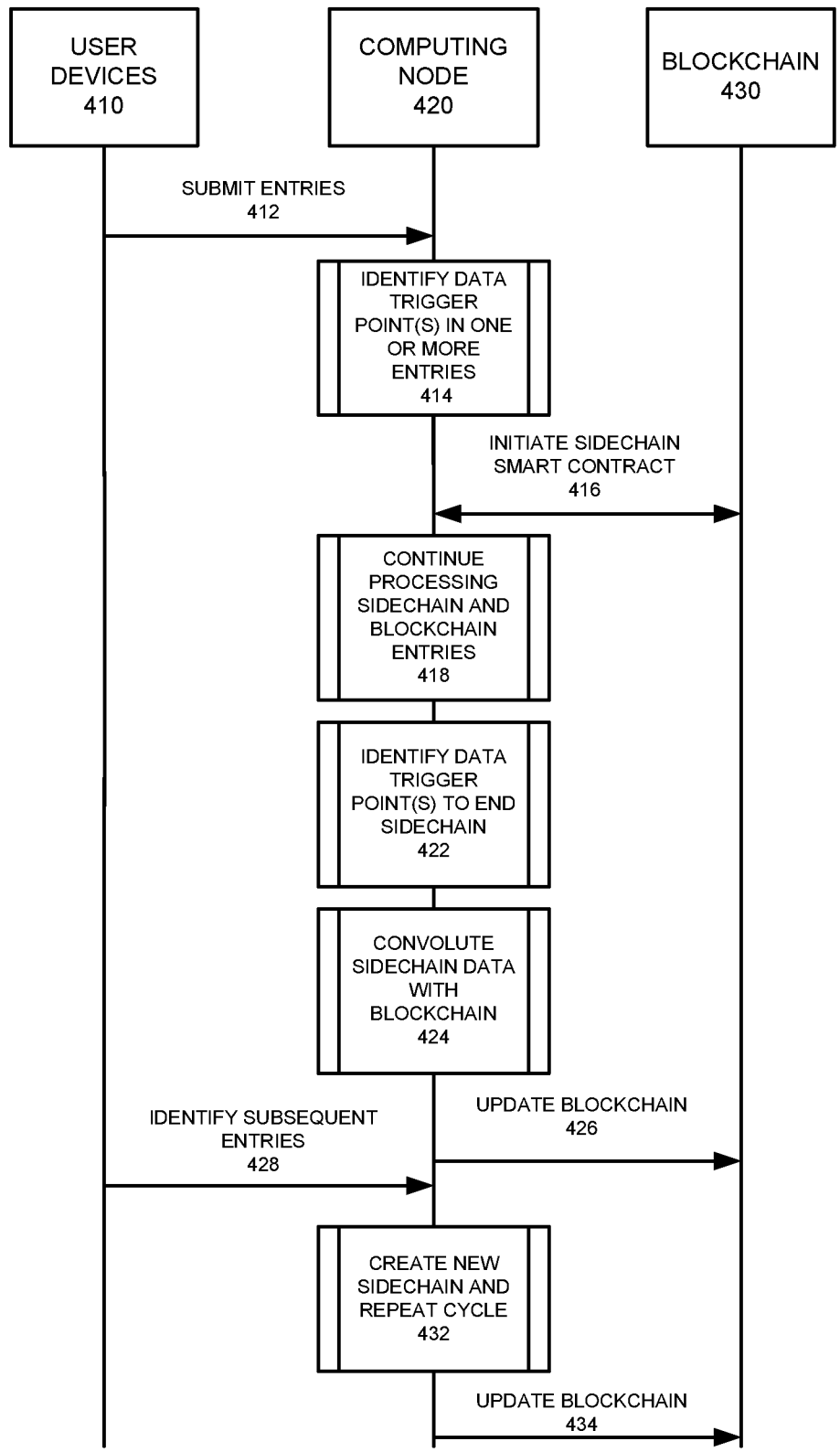
FIG. 4 illustrates a system messaging diagram of a sidechain and blockchain configuration, according to example embodiments.

FIG. 4 illustrates a system messaging diagram of a sidechain and blockchain configuration, according to example embodiments. Referring to FIG. 4, the system 400 may include one or more blockchain members/devices 410, a computing node 420 responsible for the blockchain 430 processing and the sidechain creation and convolution process, and the blockchain 430 as the immutable ledger. In one example, new data entries are received by blockchain members 412. The entries are processed to identify one or more data point triggers 414 to identify whether a sidechain is warranted to be launched or whether data entries are to be stored in the blockchain 430 or a new or existing sidechain. Once a sidechain is activated, the smart contract of the sidechain may be identified 416, which may be part of the sidechain, blockchain or both for reference purposes. The continued reception and processing of entries may be performed 418 in the blockchain and sidechains. The lifecycle of the sidechain may be finalized by a new data point trigger 422 indicating a requirement to end the sidechain. The sidechain data may be convoluted 424 into the blockchain and the updates 426 to the blockchain are performed accordingly. The subsequent entries 428 are continuously received and if necessary a new sidechain is created thus repeating the cycle 432. The blockchain is again updated 434 accordingly to convolute any data into the blockchain 430.

Figure 5A:
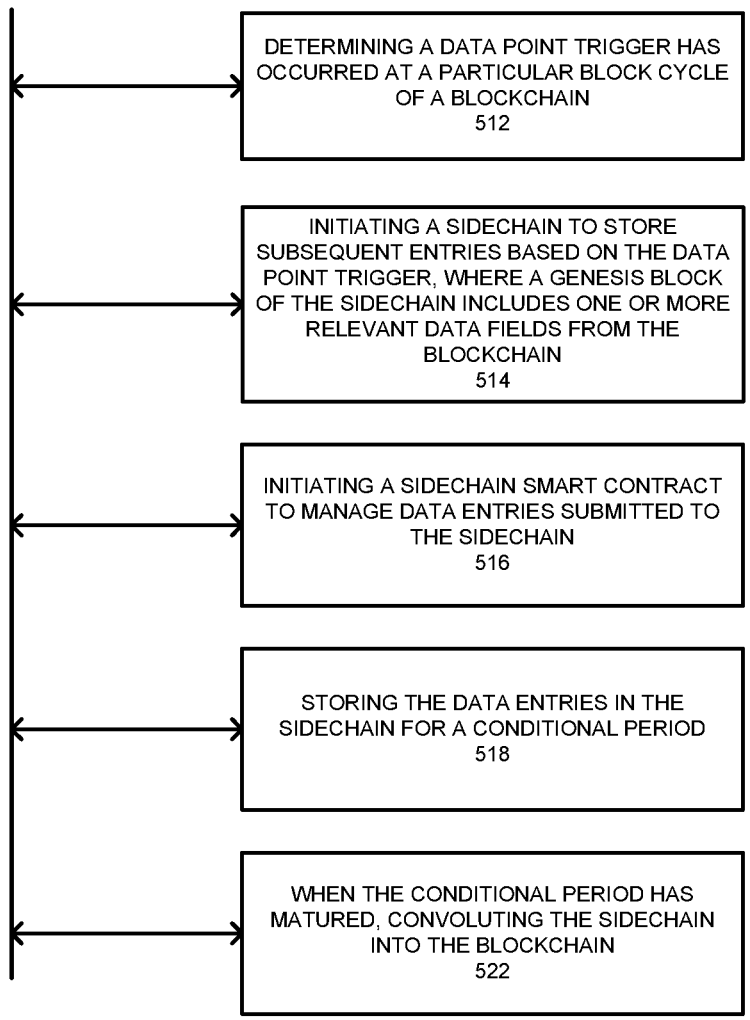
FIG. 5A illustrates a flow diagram of a sidechain and blockchain configuration, according to example embodiments.
Figure 5B:
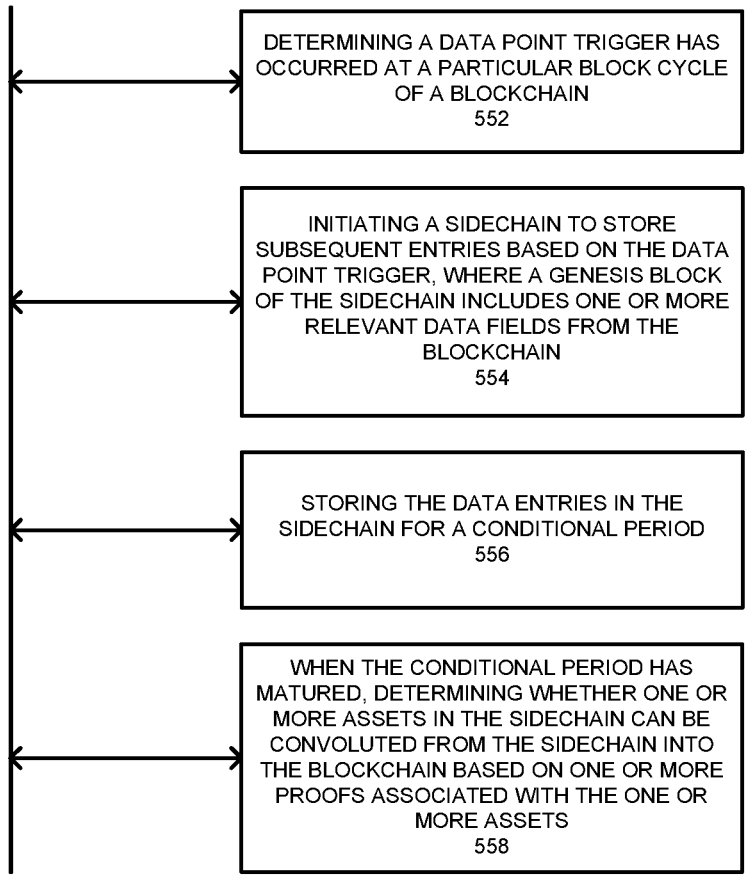
FIG. 5B illustrates a further flow diagram of a sidechain and blockchain configuration, according to example embodiments.

FIG. 5A illustrates a flow diagram of a sidechain and blockchain configuration, according to example embodiments. The example method 500 includes determining a data point trigger has occurred at a particular block cycle of a blockchain 512, initiating a sidechain to store subsequent entries based on the data point trigger, where a genesis block of the sidechain includes one or more relevant data fields from the blockchain 514, initiating a sidechain smart contract to manage data entries submitted to the sidechain 516, storing the data entries in the sidechain for a conditional period 518, and when the conditional period has matured, convoluting the sidechain into the blockchain 522. The sidechain is active for the conditional period based on a fixed period of time, and when the fixed period of time has expired, the method includes rejecting any additional entries intended for the sidechain. In another example, the sidechain is active for the conditional period based on a fixed amount of blockchain block cycles, and when the fixed amount of blockchain block cycles are completed, the method provides rejecting any additional entries intended for the sidechain. The sidechain is active for the conditional period until another data point trigger is identified, and where the another data point trigger includes one or more of identifying: a specific data file type and a specific transaction identifier. The method includes convoluting the sidechain into the blockchain by storing a portion of the sidechain data in a current block of the blockchain at a time associated with the convoluting of the sidechain into the blockchain. Convoluting the sidechain into the blockchain may include storing all the sidechain data in a current block of the blockchain at a time associated with the convoluting of the sidechain into the blockchain. The method may also include determining another data point trigger has occurred at another particular block created subsequent to the particular block of the blockchain, and responsive to determining the another data point trigger has occurred, initiating another sidechain FIG. 5B illustrates a further flow diagram of a sidechain and blockchain configuration, according to example embodiments. Referring to FIG. 5B, the method 550 provides determining a data point trigger has occurred at a particular block cycle of a blockchain 552, initiating a sidechain to store subsequent entries based on the data point trigger, where a genesis block of the sidechain includes one or more relevant data fields from the blockchain 554, storing the data entries in the sidechain for a conditional period 556, and when the conditional period has matured, determining whether one or more assets in the sidechain can be convoluted from the sidechain into the blockchain based on one or more proofs associated with the one or more assets 558.

In addition to just convoluting the content of the sidechain into the blockchain at the sidechain's maturity point, the assets stored in the sidechain may require a threshold level of proof prior to being accepted into the blockchain. The proofs may be associated with a certain type of encryption, a certain amount of endorsements from blockchain peers, a particular asset type and/or a current asset status, such as approved, completed, transferred, etc.

Figure 6A:
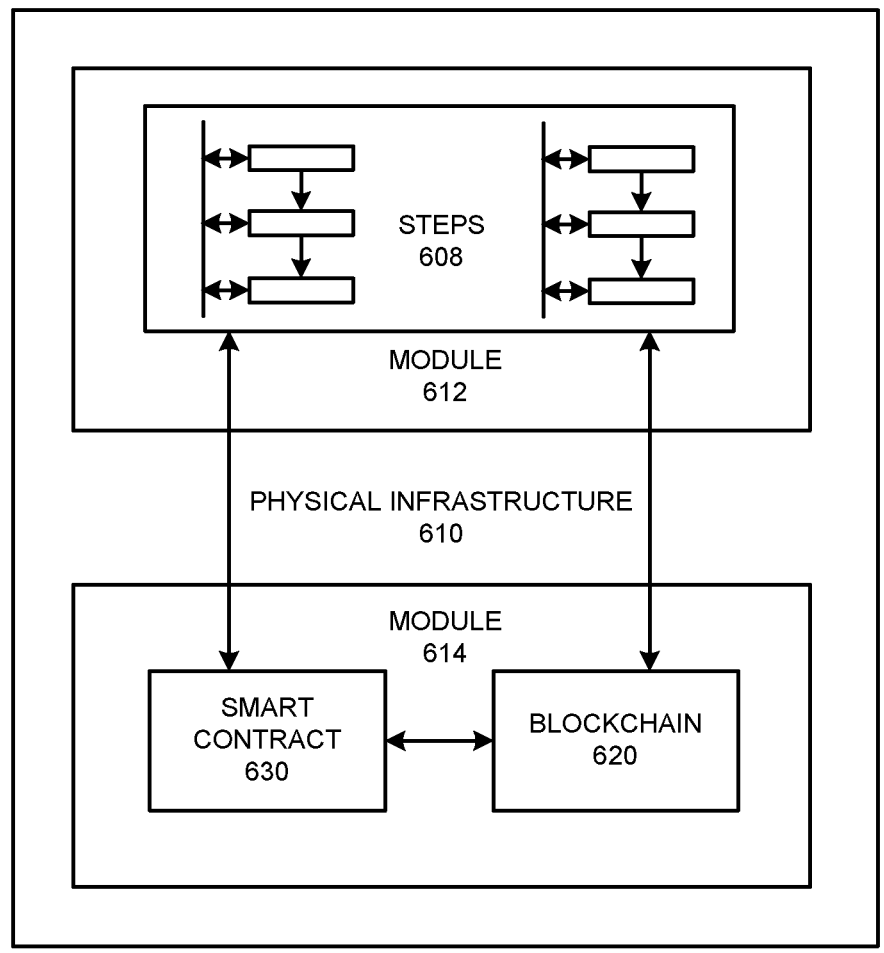
FIG. 6A illustrates an example system configured to perform one or more operations described herein, according to example embodiments.

FIG. 6A illustrates an example system 600 that includes a physical infrastructure 610 configured to perform various operations according to example embodiments. Referring to FIG. 6A, the physical infrastructure 610 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6B:
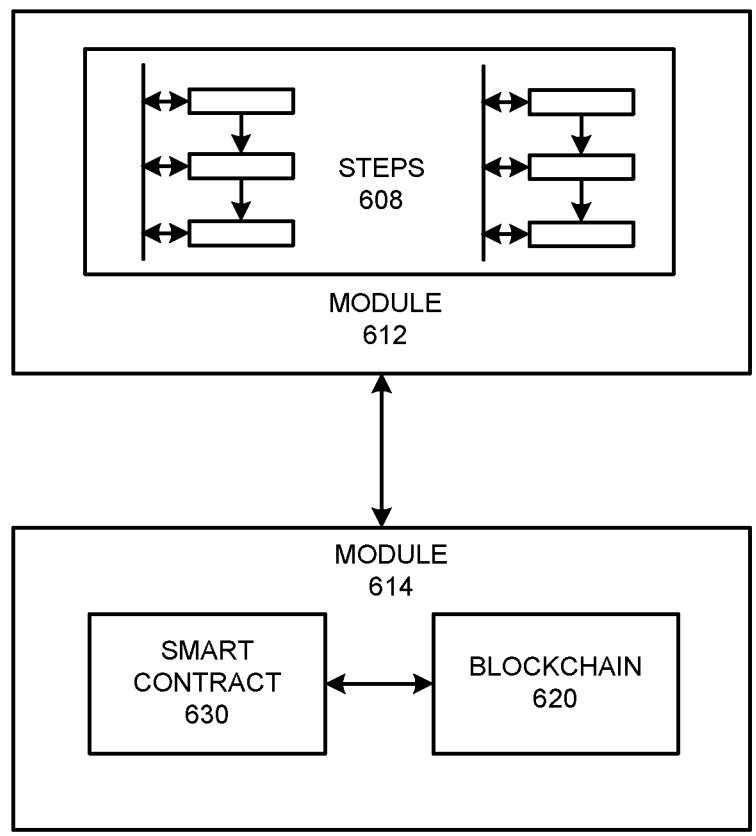
FIG. 6B illustrates a further example system configured to perform one or more operations described herein, according to example embodiments.

FIG. 6B illustrates an example system 640 configured to perform various operations according to example embodiments. Referring to FIG. 6B, the system 640 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6C:
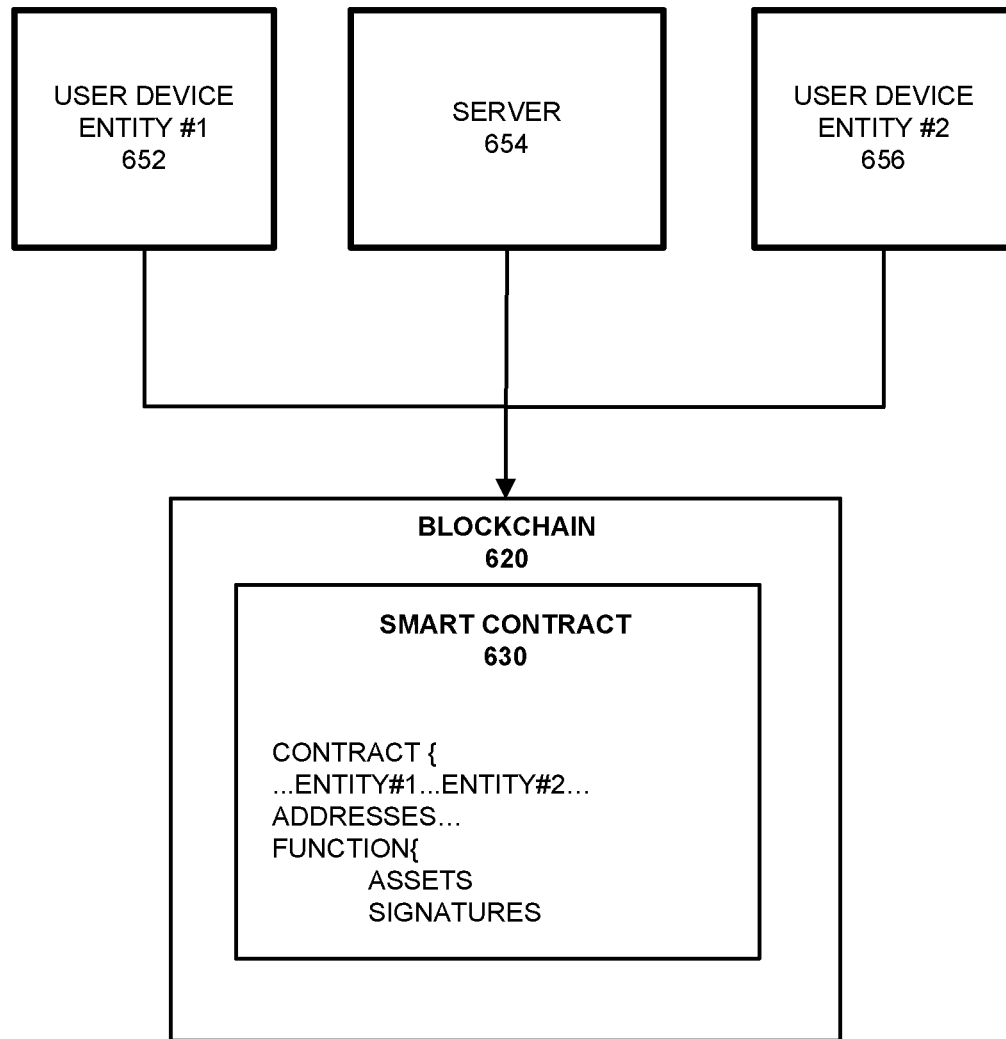
FIG. 6C illustrates a smart contract configuration among contracting parties and a mediating server configured to enforce the smart contract terms on the blockchain according to example embodiments.

FIG. 6C illustrates an example smart contract configuration among contracting parties and a mediating server configured to enforce the smart contract terms on the blockchain according to example embodiments. Referring to FIG. 6C, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract entry. The results of the smart contract execution may be written to a blockchain 620 as a blockchain entry. The smart contract 630 resides on the blockchain 620 which may reside on one or more computers, servers, processors, memories, and/or wireless communication devices.

Figure 6D:
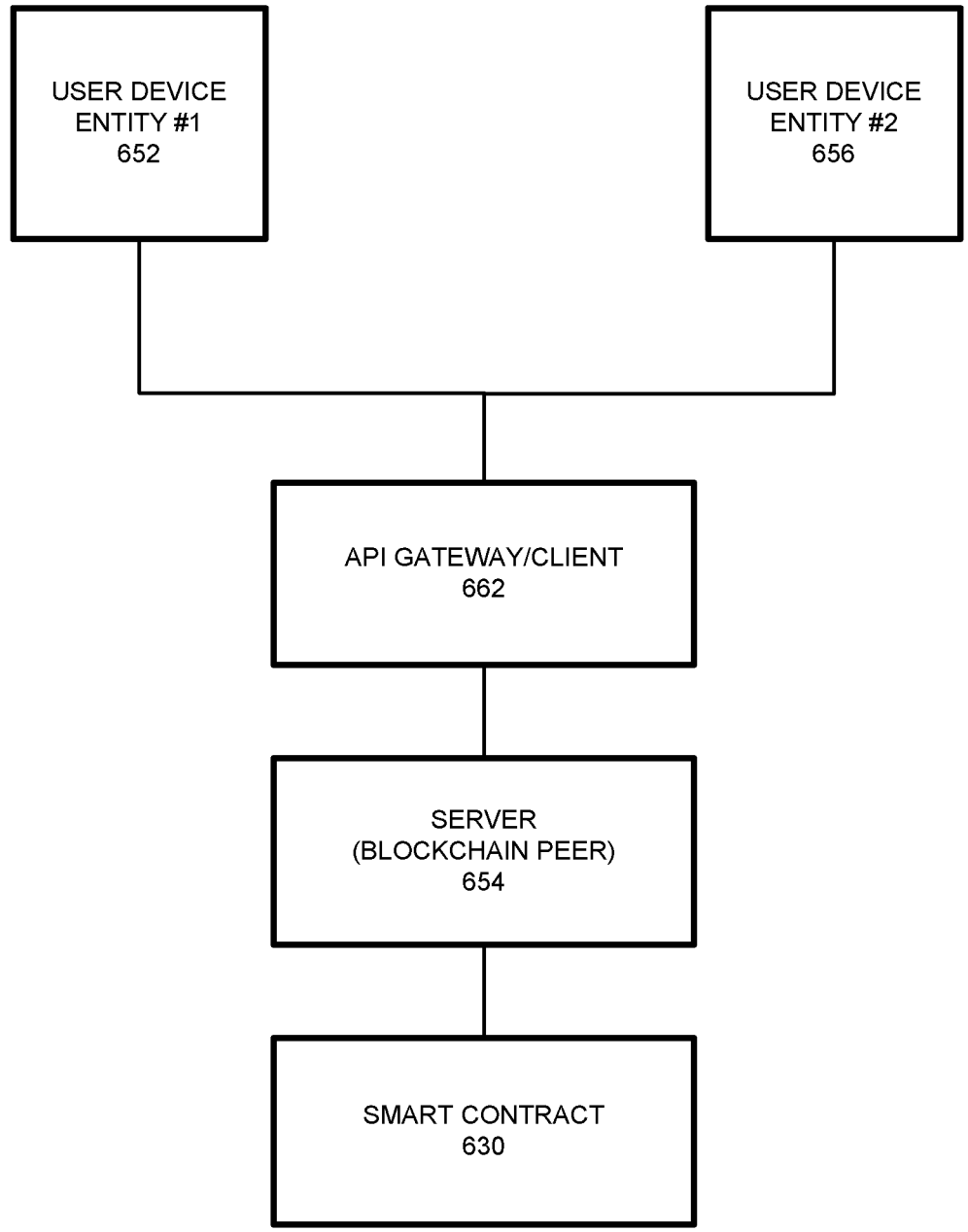
FIG. 6D illustrates another an additional example system, according to example embodiments.

FIG. 6D illustrates a common interface for accessing logic and data of a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.) In this example, the API gateway 662 is a common interface for performing entries (invoke, queries, etc.) on the blockchain by connecting one or more entities 652 and 656 to a blockchain peer (i.e., server 654). Here, the server 654 is a blockchain network peer component that holds a copy of the world state and a distributed ledger allowing clients 652 and 656 to query data on the world state as well as submit entries into the blockchain network where, depending on the smart contract 630 and endorsement policy, endorsing peers will run the smart contracts 630.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7A:
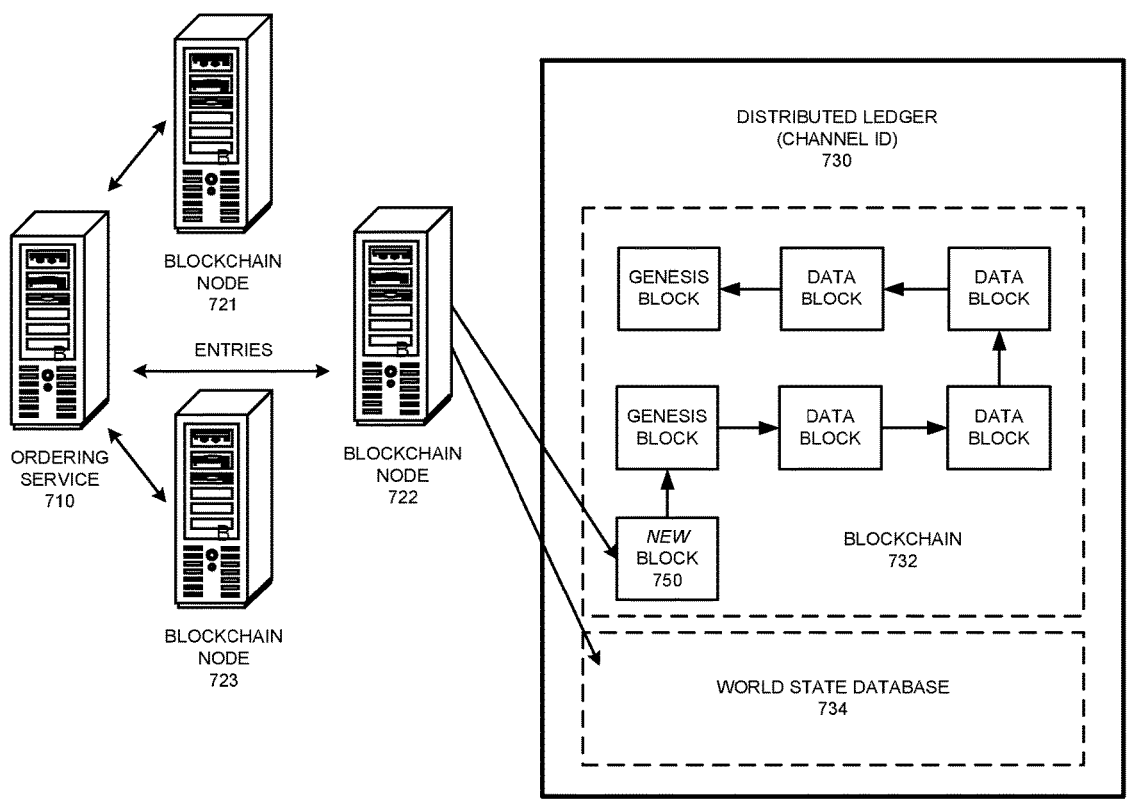
FIG. 7A illustrates a process of new data being added to a database, according to example embodiments.
Figure 7B:
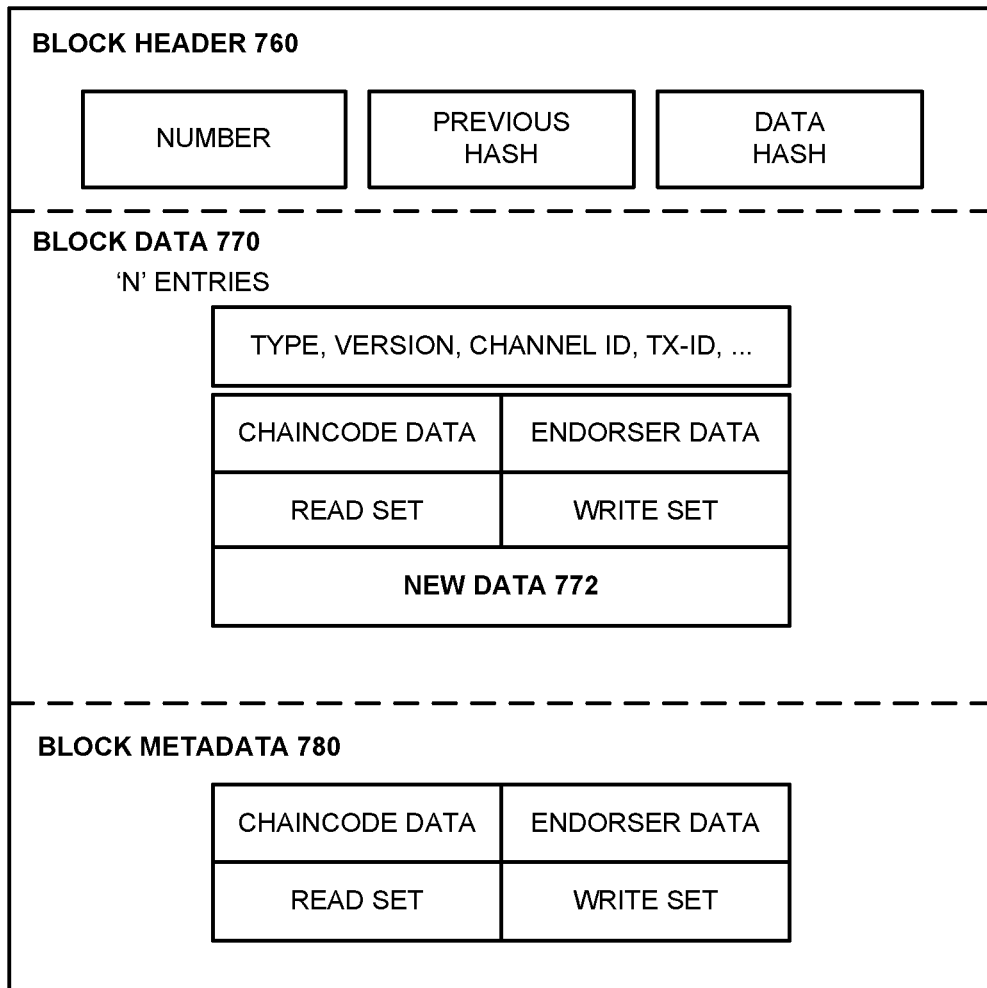
FIG. 7B illustrates contents of a data block including the new data, according to example embodiments.

FIG. 7A illustrates a process 700 of a new block being added to a distributed ledger 730, according to example embodiments, and FIG. 7B illustrates contents of a block structure 750 for blockchain, according to example embodiments. Referring to FIG. 7A, clients (not shown) may submit entries to blockchain nodes 721, 722, and/or 723. Clients may be instructions received from any source to enact activity on the blockchain 730. As an example, clients may be applications that act on behalf of a requester, such as a device, person or entity to propose entries for the blockchain. The plurality of blockchain peers (e.g., blockchain nodes 721, 722, and 723) may maintain a state of the blockchain network and a copy of the distributed ledger 730. Different types of blockchain nodes/peers may be present in the blockchain network including endorsing peers which simulate and endorse entries proposed by clients and committing peers which verify endorsements, validate entries, and commit entries to the distributed ledger 730. In this example, the blockchain nodes 721, 722, and 723 may perform the role of endorser node, committer node, or both.

The distributed ledger 730 includes a blockchain 732 which stores immutable, sequenced records in blocks, and a state database 734 (current world state) maintaining a current state of the blockchain 732. One distributed ledger 730 may exist per channel and each peer maintains its own copy of the distributed ledger 730 for each channel of which they are a member. The blockchain 732 is an entry log, structured as hash-linked blocks where each block contains a sequence of N entries. Blocks may include various components such as shown in FIG. 7B. The linking of the blocks (shown by arrows in FIG. 7A) may be generated by adding a hash of a prior block's header within a block header of a current block. In this way, all entries on the blockchain 732 are sequenced and cryptographically linked together preventing tampering with blockchain data without breaking the hash links. Furthermore, because of the links, the latest block in the blockchain 732 represents every entry that has come before it. The blockchain 732 may be stored on a peer file system (local or attached storage), which supports an append-only blockchain workload.

The current state of the blockchain 732 and the distributed ledger 732 may be stored in the state database 734. Here, the current state data represents the latest values for all keys ever included in the chain entry log of the blockchain 732.

Chaincode invocations execute entries against the current state in the state database 734. To make these chaincode interactions extremely efficient, the latest values of all keys are stored in the state database 734. The state database 734 may include an indexed view into the entry log of the blockchain 732, it can therefore be regenerated from the chain at any time. The state database 734 may automatically get recovered (or generated if needed) upon peer startup, before entries are accepted.

Endorsing nodes receive entries from clients and endorse the entry based on simulated results. Endorsing nodes hold smart contracts which simulate the entry proposals. When an endorsing node endorses an entry, the endorsing nodes creates an entry endorsement which is a signed response from the endorsing node to the client application indicating the endorsement of the simulated entry. The method of endorsing an entry depends on an endorsement policy which may be specified within chaincode. An example of an endorsement policy is "the majority of endorsing peers must endorse the entry." Different channels may have different endorsement policies. Endorsed entries are forward by the client application to ordering service 710.

The ordering service 710 accepts endorsed entries, orders them into a block, and delivers the blocks to the committing peers. For example, the ordering service 710 may initiate a new block when a threshold of entries has been reached, a timer times out, or another condition. In the example of FIG. 7A, blockchain node 722 is a committing peer that has received a new data block 750 for storage on blockchain 730.

The ordering service 710 may be made up of a cluster of orderers. The ordering service 710 does not process entries, smart contracts, or maintain the shared ledger. Rather, the ordering service 710 may accept the endorsed entries and specifies the order in which those entries are committed to the distributed ledger 730. The architecture of the blockchain network may be designed such that the specific implementation of 'ordering' (e.g., Solo, Kafka, BFT, etc.) becomes a pluggable component.

Entries are written to the distributed ledger 730 in a consistent order. The order of entries is established to ensure that the updates to the state database 734 are valid when they are committed to the network. Unlike a cryptocurrency blockchain system (e.g., Bitcoin, etc.) where ordering occurs through the solving of a cryptographic puzzle, or mining, in this example the parties of the distributed ledger 730 may choose the ordering mechanism that best suits that network.

When the ordering service 710 initializes a new block 750, the new block 750 may be broadcast to committing peers (e.g., blockchain nodes 721, 722, and 723). In response, each committing peer validates the entry within the new block 750 by checking to make sure that the read set and the write set still match the current world state in the state database 734. Specifically, the committing peer can determine whether the read data that existed when the endorsers simulated the entry is identical to the current world state in the state database 734. When the committing peer validates the entry, the entry is written to the blockchain 732 on the distributed ledger 730, and the state database 734 is updated with the write data from the read-write set. If an entry fails, that is, if the committing peer finds that the read-write set does not match the current world state in the state database 734, the entry ordered into a block will still be included in that block, but it will be marked as invalid, and the state database 734 will not be updated.

Referring to FIG. 7B, a block 750 (also referred to as a data block) that is stored on the blockchain 732 of the distributed ledger 730 may include multiple data segments such as a block header 760, block data 770, and block metadata 780. It should be appreciated that the various depicted blocks and their contents, such as block 750 and its contents. shown in FIG. 7B are merely for purposes of example and are not meant to limit the scope of the example embodiments. In some cases, both the block header 760 and the block metadata 780 may be smaller than the block data 770 which stores entry data, however this is not a requirement. The block 750 may store transactional information of N entries (e.g., 100, 500, 1000, 2000, 3000, etc.) within the block data 770. The block 750 may also include a link to a previous block (e.g., on the blockchain 732 in FIG. 7A) within the block header 760. In particular, the block header 760 may include a hash of a previous block's header. The block header 760 may also include a unique block number, a hash of the block data 770 of the current block 750, and the like. The block number of the block 750 may be unique and assigned in an incremental/sequential order starting from zero. The first block in the blockchain may be referred to as a genesis block which includes information about the blockchain, its members, the data stored therein, etc.

The block data 770 may store entry information of each entry that is recorded within the block 750. For example, the entry data may include one or more of a type of the entry, a version, a timestamp, a channel ID of the distributed ledger 730, an entry ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the entry, etc.), a write set (list of key and value, etc.), a start key, an end key, a list of keys, a Merkel tree query summary, and the like. The entry data may be stored for each of the N entries.

In some embodiments, the block data 770 may also store data 772 which adds additional information to the hash-linked chain of blocks in the blockchain 732. Accordingly, the data 772 can be stored in an immutable log of blocks on the distributed ledger 730. Some of the benefits of storing such data 772 are reflected in the various embodiments disclosed and depicted herein.

The block metadata 780 may store multiple fields of metadata (e.g., as a byte array, etc.). Metadata fields may include signature on block creation, a reference to a last configuration block, an entry filter identifying valid and invalid entries within the block, last offset persisted of an ordering service that ordered the block, and the like. The signature, the last configuration block, and the orderer metadata may be added by the ordering service 710. Meanwhile, a committer of the block (such as blockchain node 722) may add validity/invalidity information based on an endorsement policy, verification of read/write sets, and the like. The entry filter may include a byte array of a size equal to the number of entries in the block data 770 and a validation code identifying whether an entry was valid/invalid.

Figure 8:
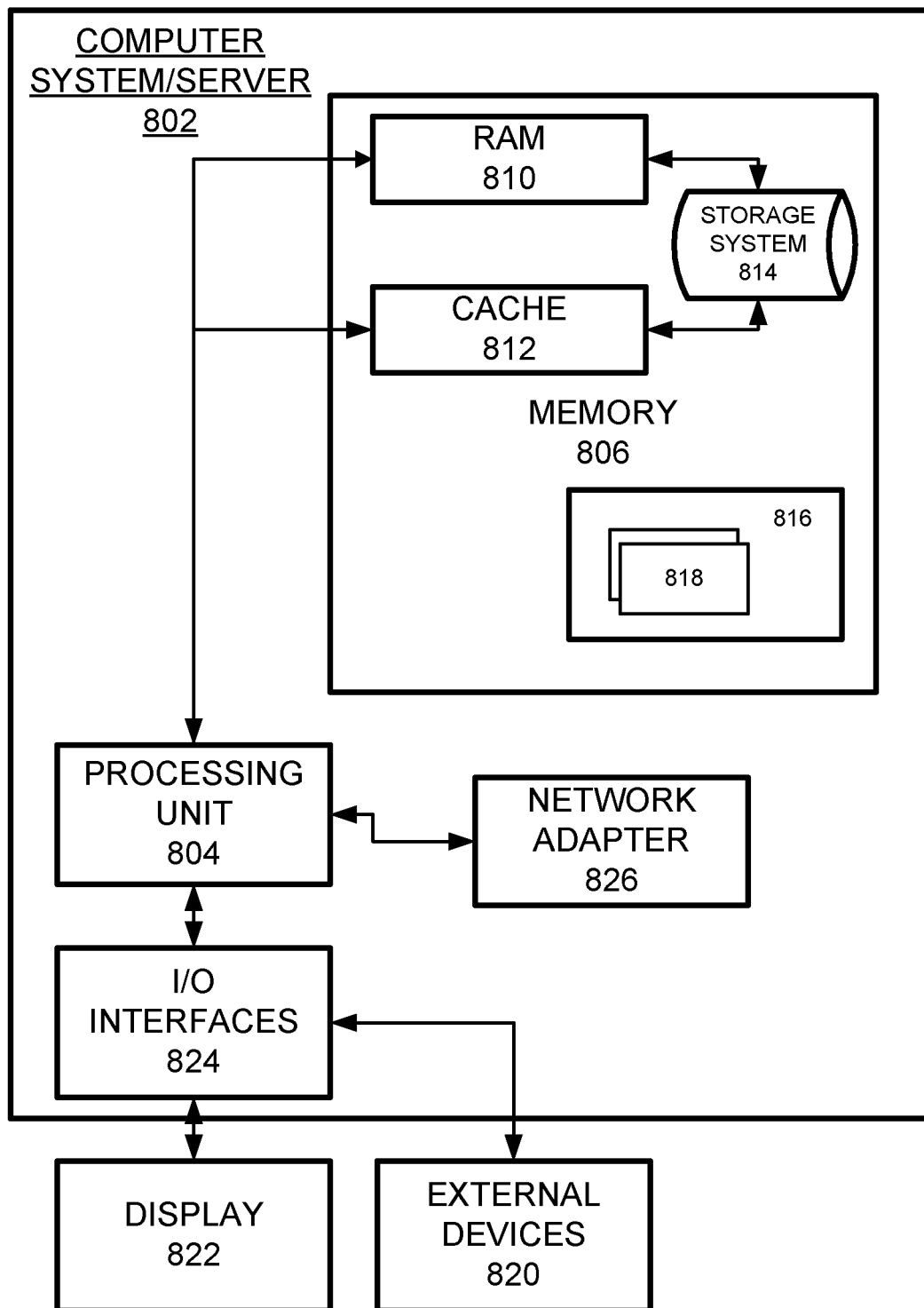
FIG. 8 illustrates an example system that supports one or more of the example embodiments.

FIG. 8 is not intended to suggest any limitation as to the scope of use or functionality of embodiments of the application described herein. Regardless, the computing node 800 is capable of being implemented and/or performing any of the functionality set forth hereinabove.

In computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media. System memory 806, in one embodiment, implements the flow diagrams of the other figures. The system memory 806 can include computer system readable media in the form of volatile memory, such as random-access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 806 may include at least one program product having a set (e.g., at least one) of program modules that are configured to carry out the functions of various embodiments of the application.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via a bus. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A system, comprising:
a computing node in a blockchain network, the computing node configured to:
   determine that a data point trigger has occurred at a particular block cycle of a blockchain in the blockchain network;
   initiate a sidechain to store subsequent entries based on the data point trigger, wherein a genesis block of the sidechain comprises one or more relevant data fields from a block of the blockchain;
   initiate a sidechain smart contract to manage data entries submitted to the sidechain;
   receive the data entries in the sidechain only during a conditional period; and
   merge the sidechain into the blockchain in response to a termination of the conditional period,
   wherein the conditional period of time is based on one of:
      a fixed period of time,
      a fixed amount of blockchain block cycles, or
      a period of time ending with an identification of another data point trigger.

2. The system of claim 1, wherein the the another data point trigger comprises one or more of:
a specific data file type being identified, and
a specific transaction identifier being identified.

3. The system of claim 1, wherein, when the computing node convolutes the sidechain into the blockchain, the computing node is further configured to:
store a portion of sidechain data in a current block of the blockchain at a time associated with the convolution of the sidechain into the blockchain.

4. The system of claim 1, wherein, when the computing node convolutes the sidechain into the blockchain, the computing node is further configured to:
store all the sidechain data in a current block of the blockchain at a time associated with the convolution of the sidechain into the blockchain.

5. The system of claim 1, wherein the computing node is further configured to:
determine another data point trigger has occurred at another particular block created subsequent to particular block of the blockchain; and
responsive to the another data point trigger being identified, initiate another sidechain.

6. A method, comprising:
determining, by a computing node in a blockchain network, that a data point trigger has occurred at a particular block cycle of a blockchain in the blockchain network;
initiating a sidechain to store subsequent entries based on the data point trigger, wherein a genesis block of the sidechain comprises one or more relevant data fields from a block of the blockchain;
initiating a sidechain smart contract to manage data entries submitted to the sidechain;
receiving the data entries in the sidechain only during a conditional period; and
merging the sidechain into the blockchain in response to terminating of the conditional period,
wherein the conditional period of time is based on one of:
   a fixed period of time,
   a fixed amount of blockchain block cycles, or a period of time ending with an identification of another data point trigger.

7. The method of claim 6, wherein identifying the another data point trigger comprises identifying one or more of:
a specific data file type, and
a specific transaction identifier.

8. The method of claim 6, wherein convoluting the sidechain into the blockchain comprises:
storing a portion of sidechain data in a current block of the blockchain at a time associated with the convoluting of the sidechain into the blockchain.

9. The method of claim 6, wherein convoluting the sidechain into the blockchain comprises:
storing all the sidechain data in a current block of the blockchain at a time associated with the convoluting of the sidechain into the blockchain.

10. The method of claim 6, further comprising:
determining another data point trigger has occurred at another particular block created subsequent to particular block of the blockchain; and
responsive to determining the another data point trigger has occurred, initiating another sidechain.

11. A non-transitory computer readable storage medium configured to store one or more instructions that when executed by a processor in a blockchain network cause the processor to perform:
determining that a data point trigger has occurred at a particular block cycle of a blockchain in the blockchain network;
initiating a sidechain to store subsequent entries based on the data point trigger, wherein a genesis block of the sidechain comprises one or more relevant data fields from a block of the blockchain;
initiating a sidechain smart contract to manage data entries submitted to the sidechain;
receiving the data entries in the sidechain only during a conditional period; and
merging the sidechain into the blockchain in response to terminating of the conditional period, wherein the conditional period of time is based on one of:
a fixed period of time,
a fixed amount of blockchain block cycles, or
a period of time ending with an identification of another data point trigger.

12. The non-transitory computer readable storage medium of claim 11, wherein the the another data point trigger comprises one or more of:
a specific data file type, and
a specific transaction identifier.

13. The non-transitory computer readable storage medium of claim 11, wherein convoluting the sidechain into the blockchain comprises:
storing a portion of sidechain data in a current block of the blockchain at a time associated with the convoluting of the sidechain into the blockchain, or
storing all the sidechain data in a current block of the blockchain at a time associated with the convoluting of the sidechain into the blockchain.

14. The non-transitory computer readable storage medium of claim 11, wherein the one or more instruction further cause the processor to perform:
determining another data point trigger has occurred at another particular block created subsequent to particular block of the blockchain; and
responsive to determining the another data point trigger has occurred, initiating another sidechain.

* * * * *